UNITED STATES PATENT OFFICE 2,653,864

METHOD OF DESTROYING PLANTS

Arthur H. Schlesinger, Dayton, Ohio, assignor to Monsanto Chemical Company, St. Louis, Mo., a corporation of Delaware No Drawing. Application December 26, 1951, Serial No. 263,485

4 Claims. (Cl. 71—2.3)

The present invention provides new and highly valuable herbicidal compositions and methods of destroying or preventing plant growth in which said compositions are employed.

I have found that improved, very efficient herbicidal compositions are obtained when there are prepared oil-in-water emulsions of a fluorenone compound having the formula

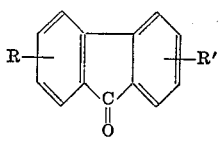

in which R and R' are selected from the class consisting of hydrogen and alkyl radicals of from 1 to 5 carbon atoms. Compounds having the above formula include 9-fluorenone, 2-methyl-9-fluorenone, 3,6-dimethyl-9-fluorenone, 2-ethyl-9-fluorenone, 7-isopropyl-1-methyl-9-fluorenone, 3,6-di-n-butyl-9-fluorenone, 3-isoamyl-9-fluorenone, etc. The compounds are prepared in known manner, e. g., by oxidation of fluorene or of the appropriate alkyl-substituted fluorenes or by the dehydrogenating ring-closure of benzophenone or the appropriate alkyl derivatives thereof.

Herbicidal compositions containing the present fluorenones are readily obtained by first preparing a solution of the fluorenone in an organic solvent and then adding the resulting solution to water containing an emulsifying agent to form an emulsion. Because of the very high herbicidal efficiency of the fluorenones they are present in the herbicidal composition in only very small concentrations, for example, in concentrations of from 0.1 per cent to 2 per cent by weight of the total weight of the emulsion. Emulsifying agents which may be employed are those customarily used in the art for the preparation of oil-in-water emulsions. The word "oil" is here used to designate any liquid which is insoluble in water. Since the fluorenones are highly stable compounds of little chemical reactivity, they are not affected by either ionic or nonionic emulsifying agents. Examples of emulsifying agents which may be used include alkylbenzenesulfonates, long-chained polyalkylene glycols, long-chained succinates, etc. Examples of organic solvents which may be used in preparing the emulsions include hydrocarbon liquids such as kerosene, hexane, benzene, and toluene; fatty oils, nitro compounds such as nitrobenzene or nitrobutane, chloro compounds such as carbon tetrachloride or the chlorobenzenes, ketones such as cyclohexanone or methyl ethyl ketone, etc.

The emulsions may be used to destroy already existing plant growth by direct application to the undesirable plants, e. g., by spraying; or the emulsions may be employed to prevent plant growth by application to media which normally support plant growth. When employed to prevent plant growth, for example in parking areas, highway abutments, railway yards, etc., the emulsions may be applied by spraying only the surface of said media or they may be admixed with said media. Generally, spraying of only the soil surface is sufficient to prevent plant growth in areas which are to be kept clear of plants. However the emulsions may be incorporated into customarily employed temporary surfacing materials, e. g., oils, cinders, etc.

The present invention is further illustrated, but not limited, by the following example:

Example

Spray testing of the present herbicidal composition was conducted as follows:

A cyclohexanone solution of 9-fluorenone and an emulsifying agent were added to water, the quantity of solution employed being calculated to give emulsions containing 1.0 per cent and 0.3 per cent, respectively, of the fluorenone, based on the total weight of each emulsion. The quantity of emulsifying agent used was 0.2 per cent by weight, based on the total weight of each emulsion. The emulsifying agent comprised a mixture of a polyalkyleneglycol derivative and an alkylbenzenesulfonate.

Three-week old corn and bean plants were respectively sprayed with each emulsion, two plants of each variety being sprayed with each emulsion. The spraying was continued until droplets formed on and/or fell from the foliage and stems of the sprayed plants, up to 15 ml. of the emulsion being applied to each plant. The sprayed plants as well as two untreated "blank" specimens of each plant were then allowed to remain under standard conditions of sunlight and watering for a period of one week. At the end of that time the sprayed plants were compared with the untreated plants in order to determine the extent of injury, if any.

Plants of both varieties which had been sprayed with the 1.0 per cent emulsion of 9-fluorenone were completely dead, with leaves dried. Those which had been sprayed with the 0.3 per cent emulsion evidenced moderate injury.

While the present fluorenones are most advantageously employed as herbicides by incorporating them into emulsions as herein described, they may also be employed in other plant destroying methods. Thus they may be incorporated into solid carriers such as clay, talc, pumice and bentonite to give herbicidal compositions which may be applied to living plants or to surfaces which are to be freed from plant growth. The fluorenones may also be mixed with liquid or solid agricultural pesticides, e. g., insecticides and fungicides. While solutions of the compounds in organic solvents may be employed for preventing and destroying plant-growth, we have found that the emulsions possess an improved tendency to adhere to the treated surfaces and that less of the active ingredients is required to give comparable herbicidal efficiency.

What I claim is:

1. The method of destroying undesirable plants which comprises applying to said plants a toxic quantity of a herbicidal composition comprising a fluorenone compound having the formula

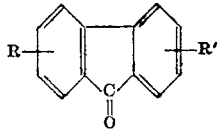

in which R and R' are selected from the class consisting of hydrogen and alkyl radicals of from 1 to 5 carbon atoms, said compound being present in said composition in a quantity which is toxic to plant life.

2. The method of destroying undesirable plants which comprises applying to said plants a toxic quantity of a herbicidal composition comprising an oil-in-water emulsion of a fluorenone compound having the formula

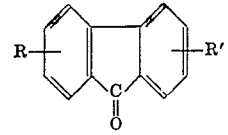

in which R and R' are selected from the class consisting of hydrogen and the alkyl radicals of from 1 to 5 carbon atoms.

3. The method of destroying undesirable plants which comprises applying to said plants a toxic quantity of a herbicidal composition comprising 9-fluorenone.

4. The method of destroying undesirable plants which comprises applying to said plants a toxic quantity of a herbicidal composition comprising an oil-in-water emulsion of 9-fluorenone.

ARTHUR H. SCHLESINGER.

References Cited in the file of this patent

Bulletin of Entomological Research (London) vol. 15 (1924–1925) pages 51 to 56.

Freer, "A Catalog of Insecticides and Fungicides," vol. I (1947) pages 102 and 189.